(12) United States Patent
Christy

(10) Patent No.: US 12,252,422 B2
(45) Date of Patent: Mar. 18, 2025

(54) PROCESS FOR TREATING SLUDGE

(71) Applicant: RDP TECHNOLOGIES, INC., Conshohocken, PA (US)

(72) Inventor: Richard W. Christy, Wayne, PA (US)

(73) Assignee: RDP TECHNOLOGIES, INC., Conshohocken, PA (US)

( * ) Notice: Subject to any disclaimer, the term of this patent is extended or adjusted under 35 U.S.C. 154(b) by 688 days.

(21) Appl. No.: 17/517,277

(22) Filed: Nov. 2, 2021

(65) Prior Publication Data

US 2022/0135460 A1 May 5, 2022

Related U.S. Application Data

(60) Provisional application No. 63/110,280, filed on Nov. 5, 2020.

(51) Int. Cl.
*C02F 11/145* (2019.01)
*C02F 11/18* (2006.01)

(52) U.S. Cl.
CPC .......... *C02F 11/145* (2019.01); *C02F 11/185* (2013.01); *C02F 2209/006* (2013.01); *C02F 2209/02* (2013.01); *C02F 2209/40* (2013.01); *C02F 2303/04* (2013.01); *C02F 2303/14* (2013.01)

(58) Field of Classification Search
CPC .................. C02F 11/145; C02F 11/185; C02F 2209/006; C02F 2209/02; C02F 2209/40; C02F 2303/04; C02F 2303/14

USPC ......................................................... 210/739
See application file for complete search history.

(56) References Cited

U.S. PATENT DOCUMENTS

| 5,013,458 A | 5/1991 | Christy, Sr. et al. |
| 5,186,840 A | 2/1993 | Christy et al. |
| 5,229,011 A | 7/1993 | Christy, Sr. et al. |
| 5,346,616 A | 9/1994 | Christy, Sr. et al. |
| 5,401,402 A | 3/1995 | Christy et al. |
| 5,405,536 A | 4/1995 | Christy |
| 5,433,844 A | 7/1995 | Christy |
| 5,554,279 A | 9/1996 | Christy |
| 5,618,442 A | 4/1997 | Christy |
| 5,681,481 A | 10/1997 | Christy et al. |
| 5,783,073 A | 7/1998 | Christy et al. |
| 5,851,404 A | 12/1998 | Christy et al. |
| 5,888,453 A * | 3/1999 | Luker .................. C02F 11/185 422/38 |
| 7,372,007 B1 | 5/2008 | McClanahan et al. |
| 10,538,446 B2 | 1/2020 | Christy |
| 2021/0346566 A1* | 11/2021 | Kumkrong ................ C05F 9/02 |

OTHER PUBLICATIONS

Watlow Electric Manufacturing Company, 2006, "Basic Temperature and Limit Controllers".

* cited by examiner

*Primary Examiner* — Ekandra S. Miller-Cruz
(74) *Attorney, Agent, or Firm* — PAUL & PAUL

(57) ABSTRACT

Process for treating sludge includes a first segment in which a batch of sludge and lime are mixed with the addition of supplement heat to achieve an elevated processing temperature and a second segment in which the mixer is maintained at a lower temperature to dry the interior of the mixing device after processing the batch.

16 Claims, 1 Drawing Sheet

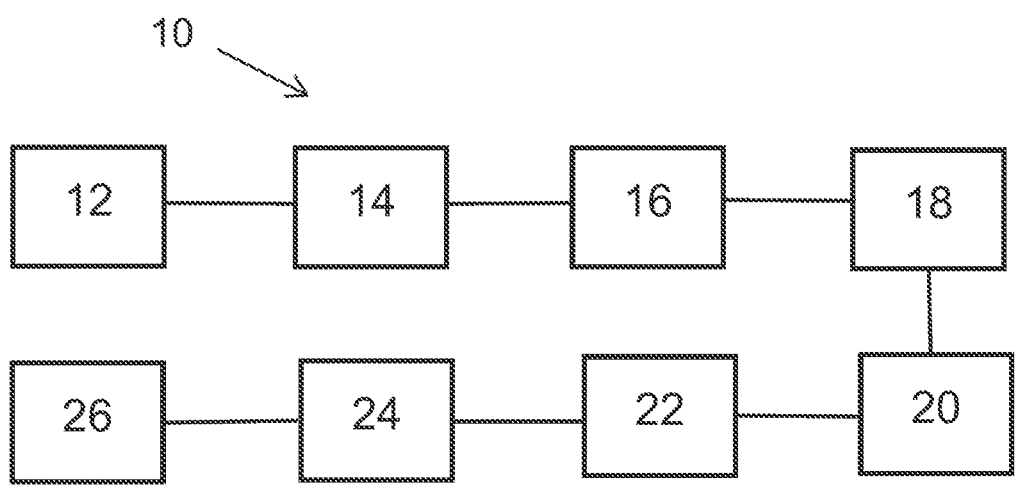

PROCESS FOR TREATING SLUDGE

FIELD OF THE INVENTION

The present invention relates to the treatment of sludge, and more particularly to the treatment of sewage sludge filter cake.

BACKGROUND OF THE INVENTION

Disposing of waste materials is an important function of any society. Modern societies consume immense amounts of resources, and concomitantly general large quantities of waste materials. Some of these materials may present health-related risks, such as municipal sewage, and must be treated to address these risks. Sewage treatment processes can generate large quantities of biologically active solid or semi-solid materials, commonly referred to as sludge, which must be treated to diminish the risk that pathological organisms will multiply and be dispersed with the sludge. The U.S. Environmental Protection Agency has established a set of standards for treatment of sewage sludge to diminish risk. Commonly, sludge is treated by mixing with lime to raise the pH and the temperature of the sludge sufficiently to neutralize the biological risk otherwise presented. This pasteurization process can be carried out using specialized equipment for thoroughly mixing sludge and lime, under controlled conditions, along with supplying extra heat to the mixture, such as the ThermoBlender apparatus provided by RDP. Municipal sewage treatment installations can differ significantly in their processing conditions. For example, some installations are largely unprotected from environmental conditions, while others attempt to mitigate the effects of environmental variations on the treatment processes. Accordingly, there is a continuing need for sludge treatment process equipment that can successfully function under a variety of environmental conditions.

SUMMARY OF THE INVENTION

The present invention provides an improved process for treating sewage sludge under a variety of environmental conditions. The process comprises providing sludge and a heat treatment apparatus for treating the sludge. The heat treatment apparatus preferably includes a mixing device and a further processing device, such as a pasteurization device or chamber. Preferably, the mixing device includes a mixing chamber having an inlet and an outlet for mixing the sludge to form a treatment mixture, as well as a conveying means for transporting the treatment mixture from the inlet to the outlet of the mixing chamber, and transferring the treatment mixture to the further processing device.

Preferably the mixing device also includes insulation for retaining heat in the mixing chamber; and at least one heating device for providing heat to the treatment mixture in the mixing chamber.

The process further includes transferring sludge to the inlet of the mixing chamber to form the treatment mixture, and conveying the treatment mixture from the inlet to the outlet of the mixing chamber, as well as transferring the treatment mixture from the outlet of the mixing device to the further processing device.

Preferably, the process also includes controlling the temperature of the at least one heating device such that the temperature of the at least one heating device conforms to a predetermined program, the predetermined program having at least a first segment and a second segment.

Preferably, the process also includes maintaining the temperature of the at least one heating device at a predetermined operational temperature while the treatment mixture is being conveyed to the outlet of the mixing device during the first segment of the predetermined program.

Preferably, the process also includes maintaining the temperature of the at least one heating device at a second predetermined temperature after the treatment mixture has been conveyed to the further processing device and the mixing chamber is substantially free of treatment mixture during the second segment of the predetermined program. Preferably, the second predetermined temperature is less than the first predetermined temperature.

In one presently preferred embodiment of the present invention, the process further comprises providing a reactive alkaline treatment agent for reaction with the sludge and mixing the reactive alkaline treatment agent with the sludge in the mixing device. In one aspect of the present invention, the further processing device is a pasteurization device. Preferably, the process further comprises controlling the rate of transport of the treatment mixture through the mixing chamber. Preferably, the first segment of the predetermined program includes gradually increasing the temperature of the at least one heating device to the first predetermined temperature. Preferably, the predetermined program includes gradually decreasing the temperature of the at least one heating device from the first predetermined operating temperature to the second predetermined temperature.

In another aspect of the present invention, the process further comprises measuring the weight of the mixing device before use to establish a tare, and subsequently measuring the weight of the mixing device after treatment when the mixing chamber is substantially free of treatment mixture to determine the amount of treatment mixture retained in the mixing chamber. Preferably, the process further comprises adjusting the temperature of the at least one heating device to dry residual treatment mixture retained in the mixing chamber for subsequent removal from the mixing chamber.

Preferably, the conveying means comprises at least one screw conveying device. Preferably, the at least one screw device is operated during both the first segment and the second segment.

In another aspect of the present invention, the at least one conveying screw is adapted to receive a recirculating heat transfer fluid, and the process further includes providing the heat transfer fluid to at least one conveying screw to provide additional heat to the mixing chamber. Preferably, the second predetermined temperature is from 40 degrees Fahrenheit to 120 degrees Fahrenheit. Preferably, the at least one conveying screw is rotated at a speed of from 1 to 10 revolutions per minute during the second segment.

In one of the presently preferred embodiments of the present invention, the mixing device includes a pair of conveying screws rotatable in opposite directions within a covered trough, and the at least one heating device includes a first plurality of tubular heating elements arranged within the conveying screws and a second plurality of tubular heating elements arranged on the interior of the covered trough outside the conveying screws. Preferably, the tubular heating elements include nickel-chromium resistance wire. Preferably, the process further comprises calculating the depth of the treatment mixture in the mixing device from the measured weight of the mixing device, and adapting the speed at which the treatment mixture is conveyed from the inlet to the outlet in response to the calculated depth of the treatment mixture. In one embodiment of the present invention, the sludge is dewatered sewage sludge.

BRIEF DESCRIPTION OF THE DRAWING

FIG. 1 is a schematic illustration of the process of the present invention.

DETAILED DESCRIPTION

U.S. Pat. Nos. 5,186,840, 5,346,616, 5,229,011, 5,405,536, 5,401,402, 5,554,279, 5,433,844, 5,618,442, 5,681,481, 5,783,073, 5,851,404, 7,372,007, and 10,538,446 are each incorporated herein by reference in their entireties.

The drawing is for the purpose of describing selected versions of the present invention and is not intended to limit the scope of the present invention.

Turning now to the FIGURE in which like elements are identified by like reference numerals, there is shown in FIG. 1 a schematic illustration of the process of the present invention. The process 10 for treating sludge includes providing sludge 12 and providing a heat treatment apparatus 14. The sludge can be dewatered sludge cake obtained, for example, by centrifuging activated sludge from a municipal wastewater treatment system to provide a sludge cake with a dry solids content of 16 to 18 percent. The heat treatment apparatus is preferably an EnVessel lime pasteurization system available from RDP Technologies, Inc., Conshohocken, PA, comprising a sludge mixing device ("ThermoBlender") and a further processing unit such as a pasteurization unit. The mixing device includes a mixing chamber having an inlet and an outlet for mixing the sludge to form a treatment mixture. In many cases, lime is added to the sludge to form the treatment mixture. The mixing device also includes a conveying means such as at least one screw conveyor or belt conveyor for transporting the treatment mixture from the inlet to the outlet of the mixing chamber, and transferring the treatment mixture to the further processing device, and at least one heating device for providing heat to the treatment mixture in the mixing chamber. For example, the mixing device can include a pair of conveying screws rotatable in opposite directions within a covered trough. The at least one heating device can include a first plurality of tubular heating elements arranged within each of the conveying screws and a second plurality of tubular heating elements arranged within the covered trough outside the conveying screws. The tubular heating elements can include nickel-chromium resistance wire.

The process further includes transferring sludge to the inlet of the mixing chamber 16, conveying the treatment mixture from the inlet to the outlet of the mixing chamber 18, and transferring treatment mixture from the outlet of the mixing device to the further processing device 20.

Preferably, the process also includes controlling the temperature of the at least one heating device such that the temperature of the at least one heating device conforms to a predetermined program 22. The predetermined program preferably has at least a first segment and a second segment.

Preferably, the process also includes maintaining the temperature of the at least one heating device at a predetermined operational temperature while treatment mixture is being conveyed to the outlet of the mixing device during the first segment of the predetermined program 24; and maintaining the temperature of the at least one heating device at a second predetermined temperature after the treatment mixture has been conveyed to the further processing device and the mixing chamber is substantially free of treatment mixture during the second segment of the predetermined program 26. Preferably, the second predetermined temperature is less than the first predetermined temperature.

Preferably, the process further includes providing a reactive alkaline treatment agent for reaction with the sludge and mixing the reactive alkaline treatment agent with the sludge in the mixing device.

Preferably, the process further includes controlling the rate of transport of the treatment mixture through the mixing chamber, such as by adjusting the rate of rotation of the screw conveyors and the rate of addition of sludge such that the level of the sludge within the mixing chamber substantially covers the conveying screw, or is otherwise adjusted to obtain the desired level of mixing.

In one aspect of the present invention, the first segment of the predetermined program includes gradually increasing the temperature of the at least one heating device to the first predetermined temperature, such as when the heat treatment device has been idle in between processing batches of sludge, thus permitting a "soft start" to the heating elements. This step is believed to be particularly useful in installations in which the heat treatment device is exposed to the environment as opposed to being housed in an enclosed protective environment. In contrast, for example, full power being initially applied to the heating devices may cause thermal stresses contributing to device failure, In another aspect, the predetermined program includes gradually decreasing the temperature of the at least one heating device from the first predetermined operating temperature to the second predetermined temperature. This step is believed to be useful after batch processing has been completed in order to maintain the interior of the mixing device at a sufficiently high temperature, short of the operating temperature for processing the treatment mixture, in order to dry the interior of the mixing chamber to reduce the likelihood of electrical problems caused by retained moisture.

In another aspect, the process further comprises measuring the weight of the mixing device before use to establish a tare, such as by mounting the mixing device on load cells, and subsequently measuring the weight of the mixing device after treatment when the mixing chamber is substantially free of treatment mixture to determine the amount of treatment mixture retained in the mixing chamber.

Preferably, the process also includes adjusting the temperature of the at least one heating device to dry residual treatment mixture retained in the mixing chamber for subsequent removal from the mixing chamber. Preferably, the second predetermined temperature is from 40 degrees Fahrenheit to 120 degrees Fahrenheit.

Preferably, the conveying means comprises at least one screw conveying device, and the at least one screw device is operated during both the first segment and the second segment. Preferably, the at least one conveying screw is rotated at a speed of from 1 to 10 revolutions per minute during the second segment.

In another aspect, the at least one conveying screw is adapted to receive a recirculating heat transfer fluid, and the process further comprises providing the heat transfer fluid to at least one conveying screw to provide additional heat to the mixing chamber.

In other aspect, the process further comprises calculating the depth of the treatment mixture in the mixing device from the measured weight of the mixing device, and adapting the speed at which the treatment mixture is conveyed from the inlet to the outlet in response to the calculated depth of the treatment mixture.

Various modifications can be made in the details of the various embodiments of the method of the present invention, all within the scope and spirit of the invention as defined by the appended claims

The invention claimed is:

1. A process for treating sludge, the process comprising:
a) providing sludge;
b) providing a heat treatment apparatus, the heat treatment apparatus including, a mixing device and a further processing device,
the mixing device including
a mixing chamber having an inlet and an outlet for mixing the sludge to form a treatment mixture,
a conveying means for transporting the treatment mixture from the inlet to the outlet of the mixing chamber, and transferring the treatment mixture to the further processing device; and
at least one heating device for providing heat to the treatment mixture in the mixing chamber,
c) transferring the sludge to the inlet of the mixing chamber to form the treatment mixture;
d) conveying the treatment mixture from the inlet to the outlet of the mixing chamber;
e) transferring the treatment mixture from the outlet of the mixing device to the further processing device;
f) controlling the temperature of the at least one heating device such that the temperature of the at least one heating device conforms to a predetermined program, the predetermined program having at least a first segment and a second segment;
g) maintaining the temperature of the at least one heating device at a first predetermined operational temperature while the treatment mixture is being conveyed to the outlet of the mixing device during the first segment of the predetermined program; and
h) maintaining the temperature of the at least one heating device at a second predetermined temperature after the treatment mixture has been conveyed to the further processing device and the mixing chamber is free of the treatment mixture during the second segment of the predetermined program, the second predetermined temperature being less than the first predetermined temperature.

2. A process according to claim 1 further comprising providing a reactive alkaline treatment agent for reaction with the sludge and mixing the reactive alkaline treatment agent with the sludge in the mixing device.

3. A process according to claim 1 further comprising controlling the rate of transport of the treatment mixture through the mixing chamber.

4. A process according to claim 1, wherein the first segment of the predetermined program includes gradually increasing the temperature of the at least one heating device to the first predetermined temperature.

5. A process according to claim 1, wherein the predetermined program includes gradually decreasing the temperature of the at least one heating device from the first predetermined operating temperature to the second predetermined temperature.

6. A process according to claim 1 further comprising measuring the weight of the mixing device before use to establish a tare, and subsequently measuring the weight of the mixing device after treatment when the mixing chamber is free of the treatment mixture to determine the amount of the treatment mixture retained in the mixing chamber.

7. A process according to claim 1 further comprising adjusting the temperature of the at least one heating device to dry residual treatment mixture retained in the mixing chamber for subsequent removal from the mixing chamber.

8. A process according to claim 1 wherein the conveying means comprises at least one screw conveying device.

9. A process according to claim 8 wherein the at least one screw conveying device is operated during both the first segment and the second segment.

10. A process according to claim 8 wherein the at least one screw conveying device is adapted to receive a recirculating heat transfer fluid, and providing the heat transfer fluid to at least one screw conveying device to provide additional heat to the mixing chamber.

11. A process according to claim 1 wherein the second predetermined temperature is from 40 degrees Fahrenheit to 120 degrees Fahrenheit.

12. A process according to claim 9 wherein the at least one screw conveying device is rotated at a speed of from 1 to 10 revolutions per minute during the second segment.

13. A process according to claim 1 wherein the mixing device includes a pair of conveying screws rotatable in opposite directions within a covered trough, and the at least one heating device includes a first plurality of tubular heating elements arranged within the conveying screws and a second plurality of tubular heating elements arranged within the covered trough outside the covered conveying screws, the tubular heating elements including nickel-chromium resistance wire.

14. A process according to claim 6 further comprising calculating the depth of the treatment mixture in the mixing device from the measured weight of the mixing device, and adapting the speed at which the treatment mixture is conveyed from the inlet to the outlet in response to the calculated depth of the treatment mixture.

15. A process according to claim 1 wherein the sludge is dewatered sewage sludge.

16. A process according to claim 1 wherein the further processing device is a pasteurization device.

* * * * *